US012576709B2

(12) United States Patent
Yu et al.

(10) Patent No.: US 12,576,709 B2
(45) Date of Patent: Mar. 17, 2026

(54) TRANSVERSE DRIVING ASSEMBLY

(71) Applicant: Jing-Jin Electric Technologies Co., Ltd., Beijing (CN)

(72) Inventors: Ping Yu, Beijing (CN); Jianwen Li, Beijing (CN); Fei Wang, Beijing (CN); Yang Cao, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 18/849,360

(22) PCT Filed: Mar. 23, 2022

(86) PCT No.: PCT/CN2022/082516
§ 371 (c)(1),
(2) Date: Sep. 20, 2024

(87) PCT Pub. No.: WO2023/178557
PCT Pub. Date: Sep. 28, 2023

(65) Prior Publication Data
US 2025/0236172 A1      Jul. 24, 2025

(51) Int. Cl.
*B60K 17/16*          (2006.01)
*B60K 17/02*          (2006.01)
(Continued)

(52) U.S. Cl.
CPC .............. *B60K 17/16* (2013.01); *B60K 17/02* (2013.01); *B60K 17/08* (2013.01); *F16H 37/046* (2013.01)

(58) Field of Classification Search
CPC ........ B60K 17/16; B60K 17/02; B60K 17/08; B60K 17/165; F16H 37/046;
(Continued)

(56) References Cited

U.S. PATENT DOCUMENTS 6,401,850 B1      6/2002   Bowen
10,221,928 B2      3/2019   Mori
(Continued)

FOREIGN PATENT DOCUMENTS

CN          107269775 A      10/2017
CN          108482113 A      9/2018
(Continued)

OTHER PUBLICATIONS

European Search Report received for European Application No. 22932624.4, mailed on Feb. 14, 2025, 5 pages.
(Continued)

*Primary Examiner* — Farhana Pervin
(74) *Attorney, Agent, or Firm* — ARENTFOX SCHIFF LLP

(57)          ABSTRACT

A transverse drive assembly includes a power source, a transmission mechanism, and a reduction mechanism. The transmission mechanism includes first and second shafts arranged in parallel. The first shaft is connected to the power source and is provided thereon with a first gear and a third gear, and the second shaft includes a second gear and a fourth gear. The first gear is meshed with the second gear, and the third gear is meshed with the fourth gear. The first gear is rotationally connected to the first shaft through a clutch or the second gear is rotationally connected to the second shaft through a clutch, and the third gear is connected to the first shaft through a clutch or the fourth gear is connected to the second shaft through a clutch. The reduction mechanism is sleeved on the second shaft and connected to the differential for transmission.

11 Claims, 2 Drawing Sheets

(51) Int. Cl.
  B60K 17/08       (2006.01)
  F16H 37/04       (2006.01)
(58) Field of Classification Search
  CPC ..... F16H 2200/0021; F16H 2200/0034; F16D
                                              2027/007
  See application file for complete search history.

(56)                References Cited

U.S. PATENT DOCUMENTS

| | | | | |
|---|---|---|---|---|
| 2012/0252621 A1* | 10/2012 | Seidl | ...................... | F16D 11/00 |
| | | | | 475/150 |
| 2018/0149210 A1* | 5/2018 | Yu | ........................ | F16D 27/118 |
| 2018/0304732 A1 | 10/2018 | Yu et al. | | |
| 2019/0120350 A1* | 4/2019 | Zhong | ..................... | B60K 1/00 |
| 2020/0103013 A1 | 4/2020 | Mori | | |
| 2020/0240493 A1 | 7/2020 | Yu et al. | | |
| 2021/0031610 A1* | 2/2021 | Yu | ........................... | B60K 1/02 |
| 2021/0252972 A1* | 8/2021 | Engerman | ............. | B60K 17/02 |
| 2022/0163071 A1* | 5/2022 | Yu | ........................ | F16D 27/118 |

FOREIGN PATENT DOCUMENTS

| | | | | | |
|---|---|---|---|---|---|
| CN | 109552037 | A | | 4/2019 | |
| CN | 111674259 | A | | 9/2020 | |
| CN | 111828500 | A | * 10/2020 | ............ | F16D 27/14 |
| CN | 112644262 | A | | 4/2021 | |
| CN | 112776598 | A | | 5/2021 | |
| CN | 214492502 | U | | 10/2021 | |
| CN | 114161878 | A | * 3/2022 | ........... | F16H 37/046 |
| CN | 217170459 | U | | 8/2022 | |
| JP | 3083704 | B2 | | 9/2000 | |
| JP | 2018-168963 | A | | 11/2018 | |
| WO | 2021087946 | A1 | | 5/2021 | |

OTHER PUBLICATIONS

Office Action and Search Report received for Chinese Application No. 202210294547.1, mailed on Apr. 22, 2025, 17 pages (8 pages of original office action and 9 pages of English Translation).

International Search Report received for PCT/CN2022/082516, mailed Dec. 15, 2022, 4 pages.

Office Action received for Japanese Patent Application No. 2024-556213, mailed on Nov. 12, 2025, 12 pages (6 pages of English Translation and 6 pages of Original Document).

* cited by examiner

TRANSVERSE DRIVING ASSEMBLY

CROSS REFERENCE TO RELATED APPLICATION

This application is a National Stage Entry of PCT/CN2022/082516 filed Mar. 23, 2022, the disclosure of which is expressly incorporated by reference herein in its entirety.

TECHNICAL FIELD

The present disclosure belongs to the technical field of new energy vehicles and particularly relates to a transverse drive assembly.

BACKGROUND

With the rapid development of new energy, new energy power systems have been applied to heavy-duty vehicles gradually. Since heavy-duty vehicles must cope with different working conditions, new energy power systems need to meet the requirements of both high torque output and high vehicle speeds. In order to meet these requirements, currently, a popular solution is to use a high torque motor and a single speed reducer in the power system. Although it can meet the requirements of high torque output and high vehicle speeds, this solution is costly, and due to the large size of the high torque motor, the power density of the power system is very low.

In addition, the power systems of conventional pure electric heavy-duty vehicles are mostly arranged longitudinally, but this arrangement occupies a large space at the bottom of the vehicle, thereby resulting in limited layout space for battery packs, affecting the overall battery capacity of vehicle, and shortening the continuous driving mileage of vehicle. When the power system is arranged transversely, in order to achieve output at a high speed ratio (i.e., low gear speed ratio i≥17) when the vehicle is high loaded or climbs a ramp, a parallel shaft two-stage transmission (i.e., three parallel shafts) or three-stage transmission (i.e., four parallel shafts) are used in the prior art, but there are disadvantages such as too many gears and bearings, large assembly envelope, low efficiency, and high cost.

SUMMARY

With respect to the above problems, the present disclosure discloses a transverse drive assembly to overcome or at least partially solve the above problems.

To achieve the above object, the present disclosure adopts the following technical solutions.

The present disclosure provides a transverse drive assembly, which comprises: a power source, a transmission mechanism, and a reduction mechanism;

wherein the transmission mechanism comprises a first shaft and a second shaft arranged in parallel, the first shaft is connected to the power source for transmission, the first shaft is provided thereon with a first gear and a third gear, the second shaft is provided thereon with a second gear and a fourth gear, the first gear is meshed with the second gear for transmission, and the third gear is meshed with the fourth gear for transmission;

the first gear is rotationally connected to the first shaft for transmission through a clutch or the second gear is rotationally connected to the second shaft for transmission through a clutch, and the third gear is connected to the first shaft for transmission through a clutch or the fourth gear is connected to the second shaft for transmission through a clutch;

the reduction mechanism is sleeved on the second shaft and connected to a differential for transmission.

Further, the second shaft is a hollow shaft, and sleeved on an output half shaft on a side of the differential.

Further, the reduction mechanism comprises a sun gear, a planetary carrier, an inner ring gear, and a planetary gear;

the sun gear is sleeved on the second shaft, the inner ring gear is coaxially sleeved on an outer side of the sun gear, the planetary gear is provided between the inner ring gear and the sun gear and meshes with the inner ring gear and the sun gear respectively, the planetary gear is connected to the planetary carrier through a planetary shaft, and the planetary carrier is connected to a differential housing.

Further, the planetary carrier and the differential housing are fixedly connected through screws/bolts or welding;

or, the planetary carrier and the differential housing are an integrated structure.

Further, both the second gear and the fourth gear are sleeved on the second shaft, and a first clutch that is respectively engaged with the second gear and the fourth gear is sleeved on the second shaft.

Further, the first clutch is provided between the second gear and the fourth gear, and comprises a first elastic member, a second elastic member, a first toothed disc, a second toothed disc, a first coil, a first armature disc, and a second armature disc;

the first toothed disc and the second toothed disc are both sleeved on the second shaft, so that the first toothed disc and the second toothed disc can move axially relative to the second shaft and rotate synchronously;

the second gear is provided thereon with first end face teeth engaged with the first toothed disc, and the fourth gear is provided thereon with second end face teeth engaged with the second toothed disc;

the first armature disc and the second armature disc are respectively connected to the first toothed disc and the second toothed disc for transmission;

one end of the first elastic member is connected to the second shaft, the other end of the first elastic member is connected to the first armature disc, and the first elastic member is provided with a preload force so as to place the first toothed disc in a position engaging with the first end face teeth;

one end of the second elastic member is connected to the second shaft, the other end of the second elastic member is connected to the second armature disc, and the second elastic member is provided with a preload force so as to place the second toothed disc in a position engaging with the second end face teeth;

the first coil is provided between the first armature disc and the second armature disc, and can be attracted and connected to the first armature disc and the second armature disc respectively.

Further, the first coil comprises a first branch coil and a second branch coil arranged in parallel axially;

the first branch coil is provided with a magnetic shielding member at an end close to the second armature disc, and the second branch coil is provided with a magnetic shielding member at an end close to the first armature disc, so that the first branch coil can only attract the first armature disc after being energized, and the second branch coil can only attract the second armature disc after being energized.

Further, a first shaft shoulder is provided on the second shaft, and both the first elastic member and the second elastic member are connected to the second shaft through the first shaft shoulder.

Further, the first gear is sleeved on the first shaft, the fourth gear is sleeved on the second shaft, a second clutch is provided between the first gear and the first shaft, and a third clutch is provided between the fourth gear and the second shaft.

Further, the second clutch comprises a third elastic member, a third toothed disc, a third coil, and a third armature disc;

the third toothed disc is sleeved on the first shaft, so that the third toothed disc can move axially relative to the first shaft and rotate synchronously; the first gear is provided thereon with third end face teeth engaged with the third toothed disc, and the third armature disc is connected to the third toothed disc for transmission; one end of the third elastic member is connected to the first shaft, the other end of the third elastic member is connected to the third armature disc, and the third elastic member is provided with a preload force so as to place the third toothed disc in a position separating from the third end face teeth; the third coil is provided between the first gear and the third armature disc;

the third clutch comprises a fourth elastic member, a fourth toothed disc, a fourth coil, and a fourth armature disc;

the fourth toothed disc is sleeved on the second shaft, so that the fourth toothed disc can move axially relative to the second shaft and rotate synchronously; the fourth gear is provided thereon with fourth end face teeth engaged with the fourth toothed disc, and the fourth armature disc is connected to the fourth toothed disc for transmission; one end of the fourth elastic member is connected to the second shaft, the other end of the fourth elastic member is connected to the fourth armature disc, and the fourth elastic member is provided with a preload force so as to place the fourth toothed disc in a position separating from the fourth end face teeth; the fourth coil is provided between the fourth gear and the fourth armature disc.

The advantages and beneficial effects of the present disclosure are as follows.

In the transverse drive assembly of the present disclosure, the switching between high and low gears can be achieved by providing the first and second shafts arranged in parallel, and the power output with high transmission speed ratio can also be achieved by providing a reduction mechanism between the second shaft and the differential. The transverse drive assembly has the advantages of small envelope, light weight, low cost, and high efficiency.

BRIEF DESCRIPTION OF DRAWINGS

By reading the detailed description of the preferred embodiments below, various other advantages and benefits will become clear to a person of ordinary skill in the art. The accompanying drawings are only used for the purpose of illustrating the preferred embodiments, and should not be considered as a limitation to the present disclosure. Moreover, throughout the drawings, the same reference numerals are used to denote the same components. In the drawings.

Figure 1:
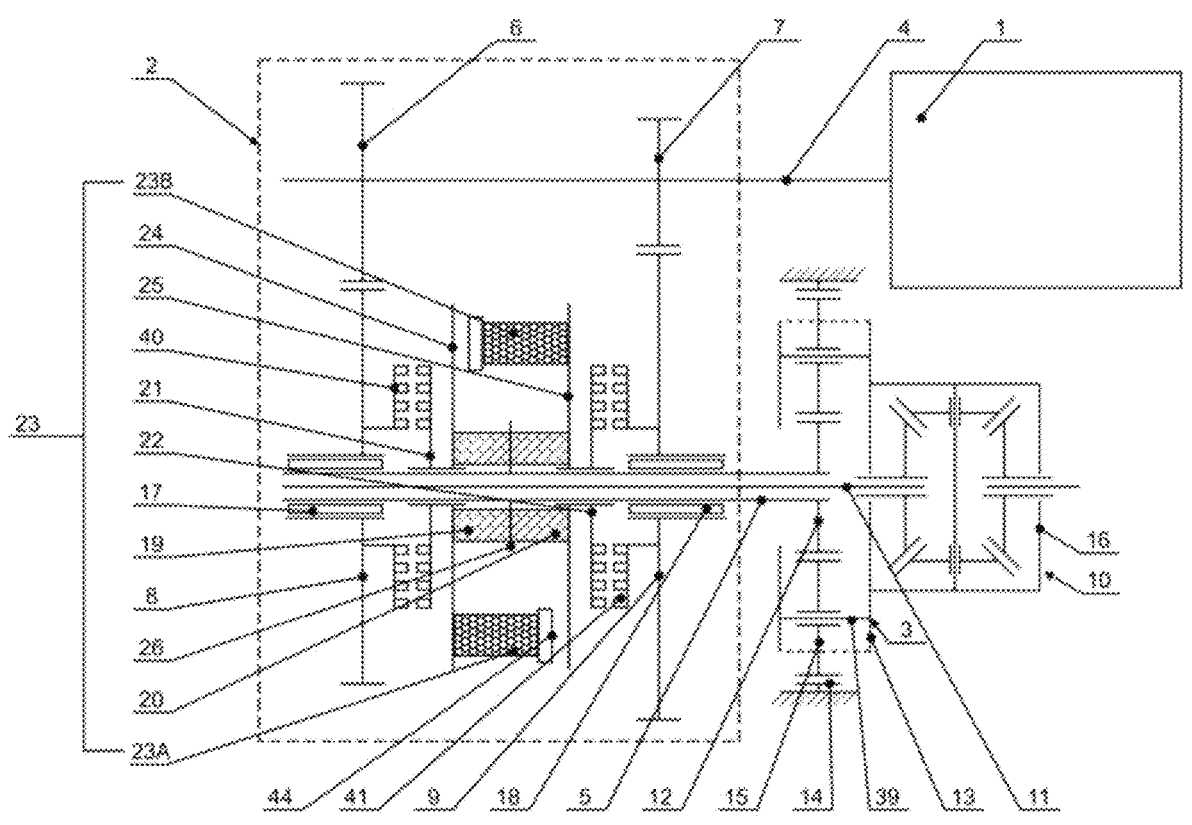
FIG. 1 is a schematic diagram of the structure of a transverse drive assembly in a first embodiment of the present disclosure.

In the drawings: 1. power source; 2. transmission mechanism; 3. reduction mechanism; 4. first shaft; 5. second shaft; 6. first gear; 7. third gear; 8. second gear; 9. fourth gear; 10. differential; 11. output half shaft; 12. sun gear; 13. planetary carrier; 14. inner ring gear; 15. planetary gear; 16. differential housing; 17. first bearing; 18. second bearing; 19. first elastic member; 20. second elastic member; 21. first toothed disc; 22. second toothed disc; 23. first coil; 23A. first branch coil; 23B. second branch coil; 24. first armature disc; 25. second armature disc; 26. first shaft shoulder; 27. third bearing; 28. fourth bearing; 29. third elastic member; 30. third toothed disc; 31. third coil; 32. third armature disc; 33. third shaft shoulder; 34. fourth elastic member; 35. fourth toothed disc; 36. fourth coil; 37. fourth armature disc; 38. fourth shaft shoulder; 39. planetary shaft; 40. first end face teeth; 44. magnetic shielding member.

DETAILED DESCRIPTION

In order to make the object, technical solutions, and advantages of the present disclosure clearer, the present disclosure will be described clearly and completely in conjunction with the specific embodiments and corresponding drawings. Obviously, the embodiments described are only part of rather than all of the embodiments of the present disclosure. Based on the embodiments in the present disclosure, all other embodiments obtained by those of ordinary skill in the art without paying creative work shall fall within the protection scope of the present disclosure.

The technical solutions provided by the embodiments of the present disclosure will be described in detail below in conjunction with the accompanying drawings.

First Embodiment

This embodiment provides a transverse drive assembly. As shown in FIG. 1, the transverse drive assembly comprises a power source 1, a transmission mechanism 2, and a reduction mechanism 3. The power source 1 may be an electric motor or an engine.

Specifically, the transmission mechanism 2 comprises a first shaft 4 and a second shaft 5 arranged in parallel. The first shaft 4 is connected to the power source 1 for transmission. A second gear 8 and a fourth gear 9 are both sleevedly installed on the second shaft 5, that is, the second gear 8 is sleevedly installed on the second shaft 5 through a first bearing 17, and the fourth gear 9 is sleevedly installed on the second shaft 5 through a second bearing 18. Although they are sleevedly installed, the second gear 8 and the fourth gear 9 do not move axially. The first bearing 17 and the second bearing 18 may be needle roller bearings. A first clutch engageable with the second gear 8 or the fourth gear 9 respectively is sleeved on the second shaft 5. By controlling the first clutch, the second gear 8 or the fourth gear 9 can be connected to the second shaft 5 for transmission.

Specifically, a first gear 6 and a third gear 7 may be fixed on the first shaft 4 through interference fitting, spline connection, or flat key connection, etc. The first gear 6 is meshed with the second gear 8 for transmission, and the third gear 7 is meshed with the fourth gear 9 for transmission. In addition, the transmission ratio of the first gear 6 and the second gear 8 is different from that of the third gear 7 and the fourth gear 9, thereby achieving two speed ratio outputs. That is, by controlling the first clutch, the transmission between the first shaft 4 and the second shaft 5 is achieved through the meshing of the first gear 6 and the second gear 8 or through the meshing of the third gear 7 and the fourth gear 9, thereby achieving the switching of four gears (low, high, neutral, and parking) to meet different working conditions.

In this embodiment, the second gear and the fourth gear are connected to the second shaft for transmission through the first clutch, that is, the connection for transmission between the second or fourth gears and the second shaft is controlled through the first clutch. In this way, when the connections for transmission between the second shaft and both the second and fourth gears are simultaneously cut off through the first clutch, the load on the second shaft can be completely unloaded, so that the second shaft operates in an unloaded state, thereby effectively reducing the power loss when the second shaft rotates.

Further, as shown in FIG. 1, the reduction mechanism 3 is sleeved on an end of the second shaft 5 that is close to the fourth gear 9, and is connected to the differential 10 for transmission. The power is transmitted to an output half shaft 11 through the differential 10, which in turn drives the wheels to rotate and achieve power output. Of course, in other embodiments, the reduction mechanism can also be sleeved on an end of the second shaft that is close to the second gear and connected to the differential for transmission.

In the transverse drive assembly of this embodiment, by controlling the transmission ratio of the gears inside the reduction mechanism and cooperating with the transmission of two speed ratios between the first and second shafts, the output of the transverse drive assembly with high transmission ratio is achieved. The transverse drive assembly only adopts a two-stage transmission structure, and can achieve high transmission ratio and high torque output without using a large torque power source. The overall structure is simpler, and it has the advantages of small envelope, light weight, low cost, and high efficiency.

In this embodiment, the rotor shaft of the power source and the first shaft adopt an integrated design, which can reduce the impact of the rotor shaft on the transmission mechanism. In other embodiments of the present disclosure, the rotor shaft of the power source may also be connected to the first shaft through a coupling.

In addition, in this embodiment, by connecting the power source to an end of the first shaft that is close to the third gear, the distance between the first and second shafts is determined based on the sizes of the power source and the differential, which can reduce the transverse length of the transverse drive assembly. Of course, in other embodiments, the power source may also be connected to an end of the first shaft that is close to the first gear. In such a case, the distance between the first and second shafts is not affected by the sizes of the power source and the differential, which can make the longitudinal length of the transverse drive assembly smaller. Therefore, the position relationship between the power source and the transmission mechanism may be adjusted according to the installation space of the transverse drive assembly, thereby meeting the needs of different vehicle models.

Moreover, as shown in FIG. 1, the second shaft 5 is a hollow shaft, and is coaxially sleeved on the output half shaft 11 on a side of the differential 10, so that the second shaft 5 can rotate relative to the output half shaft 11 and maintain relative fixation axially. The design of sleeving the second shaft 5 on the output half shaft on a side of differential 10 can fully utilize the original space of the differential 10, thereby making the longitudinal volume when the transverse drive assembly is engaged with the differential 10 even smaller.

In this embodiment, as shown in FIG. 1, the reduction mechanism 3 comprises a sun gear 12, a planetary carrier 13, an inner ring gear 14, and a planetary gear 15.

Specifically, the sun gear 12 is sleeved on the second shaft 5, and the inner ring gear 14 is coaxially sleeved on the outer side of the sun gear 12. The inner ring gear 14 is fixedly connected to the housing of the transmission mechanism 2. The planetary gear 15 is provided between the inner ring gear 14 and the sun gear 12, and meshes with the inner ring gear 14 and the sun gear 12 respectively. The planetary gear 15 is connected to the planetary carrier 13 for transmission through a planetary shaft 39, and the planetary carrier 13 is connected to the differential housing 16. The power on the second shaft 5 is transmitted to the differential housing 16 sequentially through the sun gear 12, planetary gear 15, planetary shaft 39, and planetary carrier 13. By controlling the transmission ratio between the planetary gear 15 and the sun gear 12, the transverse drive assembly can output high torque. There are multiple planetary gears. Preferably, there are three or four planetary gears.

Further, the planetary carrier and the differential housing are an integrated structure and are manufactured in one piece, which facilitates the assembly of the transverse drive assembly, and makes the connection structure between the planetary carrier and the differential housing simpler and stronger. Of course, in other embodiments, the planetary carrier and the differential housing may also be a split structure, specifically, they are processed and manufactured separately, and then fixed and connected together by screws/bolts or welding. The split planetary carrier and differential housing are easier to be processed and manufactured.

In this embodiment, as shown in FIG. 1, the first clutch is sleeved on the second shaft 5 between the second gear 8 and the fourth gear 9. The first clutch comprises a first elastic member 19, a second elastic member 20, a first toothed disc 21, a second toothed disc 22, a first coil 23, a first armature disc 24, and a second armature disc 25. The first elastic member 19 and the second elastic member 20 may be springs, elastic pieces, or spring packs.

Specifically, the first toothed disc 21 and the second toothed disc 22 are both sleeved on the second shaft 5, so that the first toothed disc 21 and the second toothed disc 22 can move axially relative to the second shaft 5 and rotate synchronously. For example, the first toothed disc 21 and the second toothed disc 22 may be connected to the second shaft 5 through splines, so that the first toothed disc 21 and the second toothed disc 22 can only move axially on the second shaft 5 and cannot rotate relative to each other.

The second gear 8 is provided thereon with first end face teeth engaged with the first toothed disc 21, and the fourth gear 9 is provided thereon with second end face teeth engaged with the second toothed disc 22. The first armature disc 24 and the second armature disc 25 are respectively connected to the first toothed disc 21 and the second toothed disc 22 for transmission.

An end of the first elastic member 19 is connected to the second shaft 5, and the other end of the first elastic member 19 is connected to the first armature disc 24. The first elastic member 19 is provided with a preload force so as to place the first toothed disc 21 in a position engaging with the first end face teeth. An end of the second elastic member 20 is connected to the second shaft 5, and the other end of the second elastic member 20 is connected to the second armature disc 25. The second elastic member 20 is provided with a preload force so as to place the second toothed disc 22 in a position engaging with the second end face teeth.

The first coil 23 is provided between the first armature disc 24 and the second armature disc 25. After being energized, the first coil 23 is respectively attracted to the first armature disc 24 and the second armature disc 25. The first armature disc 24 is fixedly connected to the first toothed disc 21, and the second armature disc 25 is fixedly connected to the second toothed disc 22. Of course, in other embodiments, the first armature disc and the second armature disc may be respectively connected to the first toothed disc and the second toothed disc for transmission through bearings, the first elastic member abuts against the second shaft and the first armature disc respectively, and the second elastic member abuts against the second shaft and the second armature disc respectively. At this point, the first armature disc and the first toothed disc can rotate independently, and the second armature disc and the second toothed disc are connected for transmission and can rotate independently, so that the first armature disc and the second armature disc do not need to rotate with the second shaft, thereby reducing the rotational load on the second shaft and thus reducing kinetic energy loss.

Moreover, as shown in FIG. 1, a first shaft shoulder 26 is provided on the second shaft, and both the first elastic member 19 and the second elastic member 20 are connected to the second shaft 5 through the first shaft shoulder 26.

Further, the first coil may be connected to the housing of the transmission mechanism to achieve relative fixation of the first coil, and the first coil comprises a first branch coil and a second branch coil arranged in parallel axially. There are multiple first branch coils and second branch coils, and the first branch coils and the second branch coils are alternately and uniformly arranged, so that the suction forces generated by the first coils on the first armature disc and the second armature disc are more uniform.

In addition, an end of the first branch coil that is close to the second armature disc and an end of the second branch coil that is close to the first armature disc are both provided with magnetic shielding members, so that the first branch coil can attract the first armature disc only after being energized, and the second branch coil can attract the second armature disc only after being energized.

When the first branch coils are energized, the first coil attracts the first armature disc to cause the first armature disc to overcome the elastic force of the first elastic member and move away from the second gear, and drives the first tooth disc to move axially to cause the first tooth disc to separate from the first end face teeth. At this point, there is no transmission between the second gear and the second shaft.

When the second branch coils are energized, the second coil attracts the second armature disc to cause the second armature disc to overcome the elastic force of the second elastic member and move away from the fourth gear, and drives the second tooth disc to move axially to cause the second tooth disc to separate from the second end face teeth. At this point, there is no transmission between the fourth gear and the second shaft.

When both the first coil and the second coil are energized, the first toothed disc separates from the first end face teeth, and the second toothed disc separates from the second end face teeth. At this point, there is no transmission either between the second gear and the second shaft or between the fourth gear and the second shaft.

In this embodiment, by arranging the first and second branch coils in parallel axially, the control of engagement of two toothed discs (i.e., the first toothed disc and the second toothed disc) with the end face teeth can be achieved through one clutch; moreover, the structure of the first clutch can be more compact, and the axial length can be shorter.

Further, the first armature disc is provided thereon with a permanent magnet corresponding to the first branch coils, and the second armature disc is provided thereon with a permanent magnet corresponding to the second branch coils. In this way, after the first branch coils and the second branch coils are energized and respectively attracted to the first and second armature discs, the first armature disc can be in a position attracting the first branch coils without continuous power supply, and the second armature disc can be in a position attracting the second branch coils without continuous power supply, thereby reducing the electrical energy loss of coils.

Of course, a position-limiting mechanism may be provided on the first clutch. After the first branch coils and the second branch coils are energized and respectively attracted to the first and second armature discs, the positions of the first armature disc and the second armature disc are limited by the position-limiting mechanism, so as to keep the first armature disc in a position engaging with the first branch coils, and keep the second armature disc in a position engaging with the second branch coils. In this way, without continuously energizing the first branch coils and the second branch coils, the first armature disc and the second armature disc can be respectively in a position engaging with the first coil, thereby reducing the power loss of coils.

The working principle of the transverse drive assembly in this embodiment is as follows.

When the first clutch is not working, due to the elastic force of the first and second elastic members, the first toothed disc is in a position engaging with the first end face teeth, and the second toothed disc is in a position engaging with the second end face teeth. The first and second shafts cannot rotate, and this is the parking gear.

When the first clutch is working, and only the first branch coils are energized, the first toothed disc is in a position separating from the first end face teeth, and the second toothed disc is in a position engaging with the second end face teeth. The power source transmits power to the second shaft sequentially through the first shaft, the third gear, and the fourth gear. This is the low gear, which can achieve high torque output.

When the first clutch is working, and only the second branch coils are energized, the second toothed disc is in a position separating from the second end face teeth, and the first toothed disc is in a position engaged with the first end face teeth. The power source transmits power to the second shaft sequentially through the first shaft, the first gear, and the second gear. This is the high gear, which can achieve high speed output.

When the first clutch is working, and both the first and second branch coils are energized, the first toothed disc is in a position separating from the first end face teeth, and the second toothed disc is in a position separating from the second end face teeth. The power transmission cannot be achieved between the first and second shafts, and this is the neutral gear.

As can be seen from the above, the transverse drive assembly can achieve two speed ratio transmissions. Through the control of the first clutch, it is possible to switch between four gears. The transmission form is flexible, and can meet the driving needs of vehicle under different road conditions. When the vehicle starts to accelerate and climbs with load, it can choose a high speed ratio transmission (i.e., a low gear) to improve the driving force of vehicle and make up for the deficiency of insufficient driving force; when the vehicle is in cruise mode, it can choose a small speed ratio transmission (i.e., a high gear) to meet the requirements of high-speed driving, save energy, and increase the continuous driving mileage of vehicle.

Of course, in other embodiments, the second gear and the fourth gear may also be connected to the second shaft for transmission through two clutches respectively, which is also within the protection scope of the present disclosure.

Second Embodiment

Figure 2:
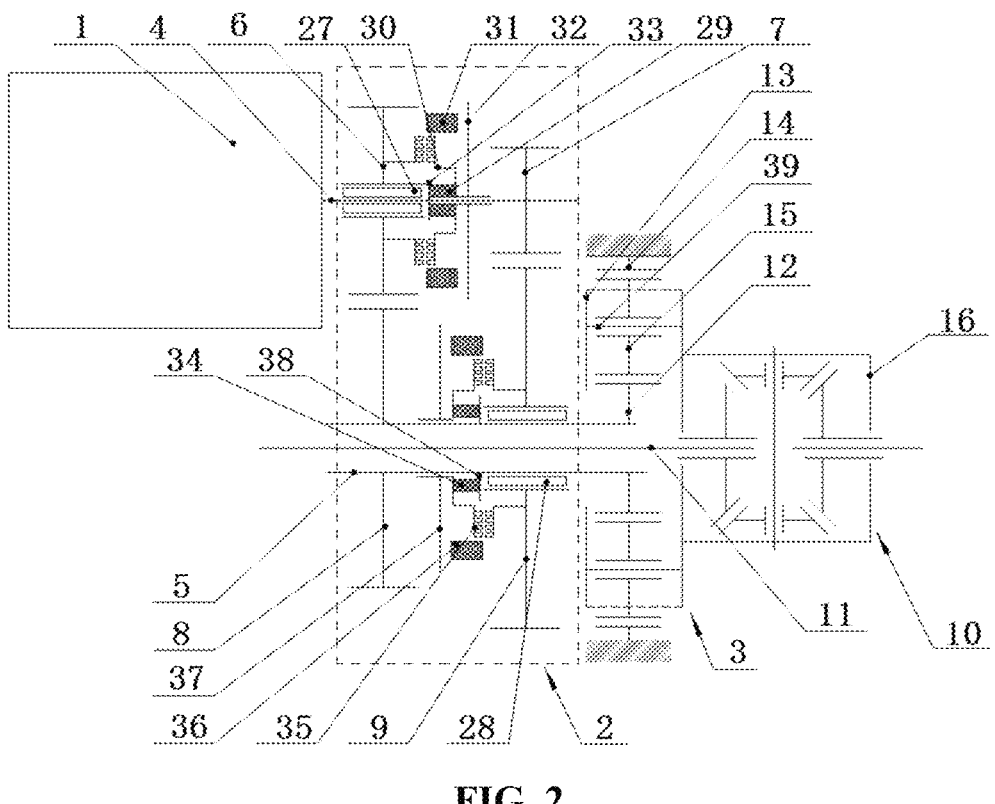
FIG. 2 is a schematic diagram of the structure of a transverse drive assembly in a second embodiment of the present disclosure.

This embodiment differs from the first embodiment in that, as shown in FIG. 2, the first gear 6 is sleeved on the first shaft 4, and the fourth gear 9 is sleeved on the second shaft 5. That is, the first gear 6 is sleevedly installed on the first shaft 4 through a third bearing 27, and the fourth gear 9 is sleevedly installed on the second shaft 5 through a fourth bearing 28. Although they are sleevedly installed, the first gear 6 and the fourth gear 9 do not move axially. The third bearing 27 and the fourth bearing 28 may be needle roller bearings. A second clutch is provided between the first gear 6 and the first shaft 4, and a third clutch is provided between the fourth gear 9 and the second shaft 5. The second gear 8 and the third gear 7 may be fixed to the first shaft 4 and the second shaft 5 respectively through interference fitting, spline connection, or flat key connection, etc. In addition, the power source 1 is connected to an end of the first shaft 4 that is close to the first gear 6, so that the distance between the first shaft 4 and the second shaft 5 is not affected by the sizes of power source 1 and the differential 10.

Further, as shown in FIG. 2, the second clutch comprises a third elastic member 29, a third toothed disc 30, a third coil 31, and a third armature disc 32. The third elastic member 29 may be a spring, an elastic piece, or a spring pack.

Specifically, the third toothed disc 30 is sleeved on the first shaft 4, so that the third toothed disc 30 can move axially relative to the first shaft 4 and rotate synchronously. For example, the third toothed disc 30 may be connected to the first shaft 4 through splines, so that the third toothed disc 30 can only move axially on the first shaft 4 and cannot rotate relative to it. The first gear 6 is provided thereon with third end face teeth engaged with the third toothed disc 30. The third armature disc 32 is connected to the third toothed disc 30 for transmission. One end of the third elastic member 29 is connected to the first shaft 4, and the other end of the third elastic member 29 is connected to the third armature disc 32. The third elastic member 29 is provided with a preload force so as to keep the third toothed disc 30 in a position separating from the third end face teeth. The third coil 31 is provided between the first gear 6 and the third armature disc 32. After being energized, the third coil 31 is attracted to the third armature disc 32 to drive the third toothed disc 30 to overcome the elastic force of the third elastic member 29 and engage with the third end face teeth. The third armature disc 32 is fixedly connected to the third toothed plate 30. Of course, in other embodiments, the third armature disc may be connected to the third tooth disc through a bearing, and the third elastic member abuts against the first shaft and the third armature disc respectively. At this point, the third armature disc and the third tooth disc can rotate independently, so that the third armature disc does not need to rotate with the first shaft, thereby reducing the rotational load on the first shaft and thus reducing kinetic energy loss.

In addition, as shown in FIG. 2, a third shaft shoulder 33 is provided on the first shaft 4, and the third elastic member 29 is connected to the first shaft 4 through the third shaft shoulder 33.

In this embodiment, as shown in FIG. 2, the third clutch comprises a fourth elastic member 34, a fourth toothed disc 35, a fourth coil 36, and a fourth armature disc 37.

Specifically, the fourth toothed disc 35 is sleeved on the second shaft 5, so that the fourth toothed disc 35 can move axially relative to the second shaft 5 and rotate synchronously. For example, the fourth toothed disc 35 may be connected to the second shaft 5 through splines, so that the fourth toothed disc 35 can only move axially on the second shaft 5 and cannot rotate relative to it. The fourth gear 9 is provided thereon with fourth end face teeth engaged with the fourth toothed disc 35. The fourth armature disc 37 is connected to the fourth toothed disc 35 for transmission. One end of the fourth elastic member 34 is connected to the second shaft 5, and the other end of the fourth elastic member 34 is connected to the fourth armature disc 37. The fourth elastic member 34 is provided with a preload force so as to keep the fourth toothed disc 35 in a position separating from the fourth end face teeth. The fourth coil 36 is provided between the fourth gear 9 and the fourth armature disc 37. After being energized, the fourth coil 36 is attracted to the fourth armature disc 37 to drive the fourth toothed disc 35 to overcome the elastic force of the fourth elastic member 34 and engage with the fourth end face teeth. The fourth armature disc 37 is fixedly connected to the fourth toothed disc 35. Of course, in other embodiments, the fourth armature disc may be connected to the fourth tooth disc through a bearing, and the fourth elastic member abuts against the second shaft and the fourth armature disc respectively. At this point, the fourth armature disc and the fourth tooth disc can rotate independently, so that the fourth armature disc does not need to rotate with the second shaft, thereby reducing the rotational load on the second shaft and thus reducing kinetic energy loss.

In addition, as shown in FIG. 2, a fourth shaft shoulder 38 is provided on the second shaft 5, and the fourth elastic member 34 is connected to the second shaft 5 through the fourth shaft shoulder 38.

The working principle of the transverse drive assembly in this embodiment is as follows.

When both the second clutch and the third clutch are not energized to work, due to the elastic force of the first and second elastic members, the first toothed disc is in a position separating from the first end face teeth, and the second toothed disc is in a position separating from the second end face teeth. There is no power transmission between the first and second shafts, and this is the neutral gear.

When the second clutch is energized to work and the third clutch is not energized to work, the first toothed disc is in a position engaging with the first end face teeth, and the second toothed disc is in a position separating from the second end face teeth. The power source transmits power to the second shaft sequentially through the first shaft, the first gear, and the second gear. This is the high gear, and can achieve high speed output.

When the second clutch is not energized to work and the third clutch is energized to work, the first toothed disc is in a position separating from the first end face teeth, and the second toothed disc is in a position engaging with the second end face teeth. The power source transmits power to the second shaft sequentially through the first shaft, the third gear, and the fourth gear. This is the low gear, and can achieve high torque output.

When both the second clutch and the third clutch are energized to work, the first toothed disc is in a position engaging with the first end face teeth, and the second toothed disc is in a position engaging with the second end face teeth. The first and second shafts cannot rotate, and this is the parking gear.

Third Embodiment

This embodiment differs from the first embodiment in that, the third gear is sleeved on the first shaft, the second gear is sleeved on the second shaft, the third gear and the second gear are connected to the first and second shafts respectively through a clutch, and the first gear and the fourth gear are fixed on the first and second shafts respectively.

Fourth Embodiment

This embodiment differs from the first embodiment in that, the first gear and the second gear are sleeved on the first shaft, the first gear and the second gear are connected to the first shaft for transmission through a clutch, and the second gear and the fourth gear are fixed on the second shaft.

The above merely describes particular embodiments of the present disclosure. By the teaching of the present disclosure, a person skilled in the art can make other modifications or variations based on the above embodiments. A person skilled in the art should appreciate that, the detailed description above is only for the purpose of explaining the present disclosure, and the protection scope of the present disclosure should be subject to the protection scope of the claims.

What is claimed is:

1. A transverse drive assembly, comprising:
a power source;
a transmission mechanism that comprises a first shaft and a second shaft arranged in parallel, the first shaft is connected to the power source for transmission, the first shaft is provided thereon with a first gear and a third gear, the second shaft is provided thereon with a second gear and a fourth gear, the first gear is meshed with the second gear for transmission, and the third gear is meshed with the fourth gear for transmission; and
a reduction mechanism,
wherein both the second gear and the fourth gear are sleeved on the second shaft, and a first clutch that is respectively engaged with the second gear and the fourth gear is sleeved on the second shaft,
the second gear is rotationally connected to the second shaft for transmission through the first clutch,
the fourth gear is connected to the second shaft for transmission through the first clutch, and
the reduction mechanism is sleeved on the second shaft and connected to a differential for transmission,
the first clutch is provided between the second gear and the fourth gear, and comprises a first elastic member, a second elastic member, a first toothed disc, a second toothed disc, a first coil, a first armature disc, and a second armature disc;
the first toothed disc and the second toothed disc are both sleeved on the second shaft, so that the first toothed disc and the second toothed disc are configured to move axially relative to the second shaft and rotate synchronously;

the second gear is provided thereon with first end face teeth engaged with the first toothed disc, and the fourth gear is provided thereon with second end face teeth engaged with the second toothed disc;

the first armature disc and the second armature disc are respectively connected to the first toothed disc and the second toothed disc for transmission;

one end of the first elastic member is connected to the second shaft, the other end of the first elastic member is connected to the first armature disc, and the first elastic member is provided with a preload force so as to place the first toothed disc in a position engaging with the first end face teeth;

one end of the second elastic member is connected to the second shaft, the other end of the second elastic member is connected to the second armature disc, and the second elastic member is provided with a preload force so as to place the second toothed disc in a position engaging with the second end face teeth; and the first coil is provided between the first armature disc and the second armature disc, and is configured to be attracted and connected to the first armature disc and the second armature disc respectively.

2. The transverse drive assembly according to claim 1, wherein the second shaft is a hollow shaft, and sleeved on an output half shaft on a side of the differential.

3. The transverse drive assembly according to claim 2, wherein the first gear is sleeved on the first shaft, the fourth gear is sleeved on the second shaft, a second clutch is provided between the first gear and the first shaft, and a third clutch is provided between the fourth gear and the second shaft.

4. The transverse drive assembly according to claim 1, wherein:
the reduction mechanism comprises a sun gear, a planetary carrier, an inner ring gear, and a planetary gear, and
wherein the sun gear is sleeved on the second shaft, the inner ring gear is coaxially sleeved on an outer side of the sun gear, the planetary gear is provided between the inner ring gear and the sun gear and meshes with the inner ring gear and the sun gear respectively, the planetary gear is connected to the planetary carrier through a planetary shaft, and the planetary carrier is connected to a differential housing.

5. The transverse drive assembly according to claim 4, wherein:
the planetary carrier and the differential housing are fixedly connected through screws/bolts or welding; or
the planetary carrier and the differential housing are an integrated structure.

6. The transverse drive assembly according to claim 5, wherein the first gear is sleeved on the first shaft, the fourth gear is sleeved on the second shaft, a second clutch is provided between the first gear and the first shaft, and a third clutch is provided between the fourth gear and the second shaft.

7. The transverse drive assembly according to claim 4, wherein the first gear is sleeved on the first shaft, the fourth gear is sleeved on the second shaft, a second clutch is provided between the first gear and the first shaft, and a third clutch is provided between the fourth gear and the second shaft.

8. The transverse drive assembly according to claim 1, wherein the first gear is sleeved on the first shaft, the fourth gear is sleeved on the second shaft, a second clutch is provided between the first gear and the first shaft, and a third clutch is provided between the fourth gear and the second shaft.

9. The transverse drive assembly according to claim 8, wherein:

the second clutch comprises a third elastic member, a third toothed disc, a third coil, and a third armature disc;

the third toothed disc is sleeved on the first shaft, so that the third toothed disc is configured to move axially relative to the first shaft and rotate synchronously; the first gear is provided thereon with third end face teeth engaged with the third toothed disc, and the third armature disc is connected to the third toothed disc for transmission; one end of the third elastic member is connected to the first shaft, the other end of the third elastic member is connected to the third armature disc, and the third elastic member is provided with a preload force so as to place the third toothed disc in a position separating from the third end face teeth; the third coil is provided between the first gear and the third armature disc;

the third clutch comprises a fourth elastic member, a fourth toothed disc, a fourth coil, and a fourth armature disc; and the fourth toothed disc is sleeved on the second shaft, so that the fourth toothed disc is configured to move axially relative to the second shaft and rotate synchronously; the fourth gear is provided thereon with fourth end face teeth engaged with the fourth toothed disc, and the fourth armature disc is connected to the fourth toothed disc for transmission; one end of the fourth elastic member is connected to the second shaft, the other end of the fourth elastic member is connected to the fourth armature disc, and the fourth elastic member is provided with a preload force so as to place the fourth toothed disc in a position separating from the fourth end face teeth; the fourth coil is provided between the fourth gear and the fourth armature disc.

10. The transverse drive assembly according to claim 1, wherein:

the first coil comprises a first branch coil and a second branch coil arranged in parallel axially, and the first branch coil is provided with a magnetic shielding member at an end close to the second armature disc, and the second branch coil is provided with a magnetic shielding member at an end close to the first armature disc, so that the first branch coil is configured to attract the first armature disc only after being energized, and the second branch coil is configured to attract the second armature disc only after being energized.

11. The transverse drive assembly according to claim 1, wherein a first shaft shoulder is provided on the second shaft, and both the first elastic member and the second elastic member are connected to the second shaft through the first shaft shoulder.

\* \* \* \* \*